Patented Sept. 23, 1941

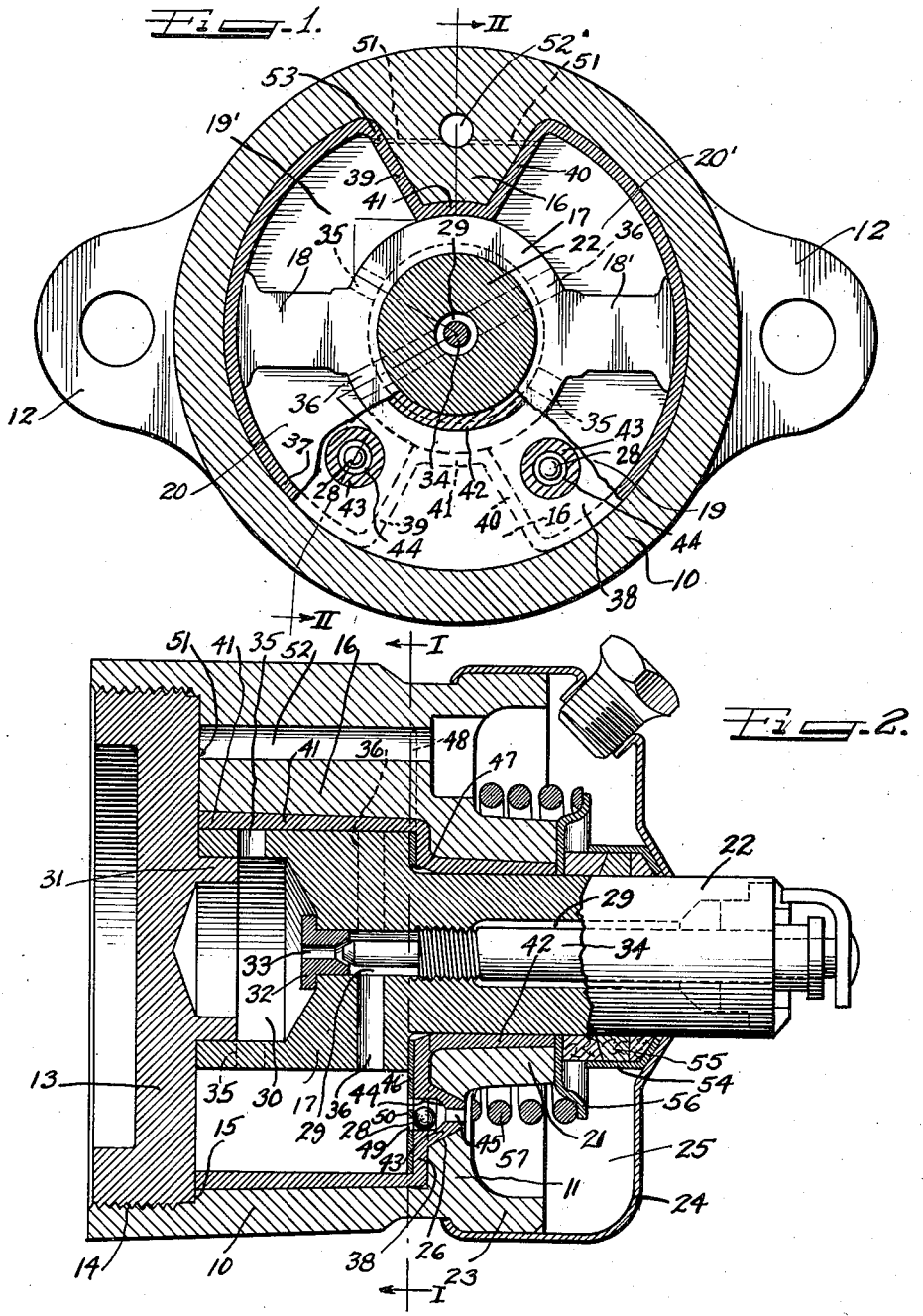

2,256,470

UNITED STATES PATENT OFFICE 2,256,470

HYDRAULIC SHOCK ABSORBER

Ralph F. Peo and Gervase M. Magrum, Buffalo, N. Y., assignors to Houde Engineering Corporation, Buffalo, N. Y., a corporation of New York Application April 13, 1940, Serial No. 329,412

7 Claims. (Cl. 188—89)

This invention relates to hydraulic shock absorbers, particularly shock absorbers of the rotary type.

In the rotary type of shock absorber, a vaned piston hub is oscillatable between abutments extending radially from the cylinder wall of the shock absorber housing, and with the piston shaft extending outwardly through an end wall forming part of the cylinder. Where the piston structure has direct bearing engagement with the cylinder wall, the abutments, and the end bearing wall, a considerable number of intricate machining operations are necessary on the various walls of the housing so that the piston structure may have accurate bearing engagement therewith. An important object of our invention is to eliminate such costly machining and finishing operations, and this we accomplish preferably by lining with suitable material the housing surfaces engaged by the piston hub, the piston vanes, and the piston shaft.

In accordance with our invention, the housing comprising the cylinder wall with its radial abutments and the piston shaft bearing wall may be readily formed by casting from suitable metal such as steel, and this housing is then used as a matrix and a core or die inserted therein, between which and the housing the lining material is injected under pressure so that, when the core is removed, the lining material will be intimately held to the housing walls to provide accurate and smooth bearing surfaces for the piston structure. If desired, the lining material may also extend into openings in the shaft bearing wall to form flow passageways for replenishing fluid and seats for the check valve balls controlling the replenishing flow, thus eliminating machining.

In hydraulic shock absorbers of the rotary type, there is considerable outward axial pressure against the piston structure during service of the shock absorber, and a further important object of our invention is to reduce wear of the outer end of the hub and the vanes, and to accomplish this we preferably provide a comparatively thin metal bearing plate between the vanes and the portion of the liner structure lining the shaft bearing end wall, such metal plate serving also to hold the replenishing valve balls in their chambers.

The above specifically referred to and other features of our invention are incorporated in the structure disclosed on the drawing, in which drawing:

Figure 1 is a section on plane I—I Figure 2; and

Figure 2 is a section on plane II—II Figure 1.

On the shock absorber shown, the housing body comprises the annular cylinder wall 10 and the end wall 11 which is preferably integral with the annular wall and this housing part may be in the form of a casting of suitable metal such as steel. The wall 10 has ears 12 extending therefrom by which the shock absorber housing may be secured to a support, usually the chassis of an automotive vehicle.

The other end wall 13 of the housing structure is removable and is in the form of a circular plate threaded on its exterior to engage in the threaded end 14 of the wall 10 of reduced diameter so as to leave a shoulder 15 against which the wall 13 abuts when installed.

The walls 10, 11 and 13 define a cylinder space, and extending radially into the cylinder space from diametrically opposite points of the wall 10 are the abutment walls 16 and 16', these walls being preferably integral with the walls 10 and 11 and are engaged at their ends by the end wall 13 when this wall is applied.

The piston structure for the shock absorber comprises the cylindrical hub 17 within the cylinder space and having the diametrically opposite vanes 18 and 18' extending therefrom. The piston hub and vanes and the abutments 16 and 16' divide the cylinder space into low pressure hydraulic working chambers 19 and 19' and high pressure hydraulic working chambers 20 and 20' in which hydraulic fluid is displaced when the piston structure oscillates relative to the cylinder structure.

The wall 11 has an outwardly extending bearing flange 21 through which extends the shaft 22 of the piston structure, this shaft in service being secured to a lever (not shown) which is connected usually with the axle of a vehicle. The wall 11 has the outer flange 23 on which is seated a sheet metal cup 24 which receives the end of the shaft 22 and which with the wall 11 defines a fluid reservoir 25. The end wall 11 has conical openings 26 therethrough for receiving lining material to provide passageways, each controlled by a check valve such as a ball 28 which permits flow from the reservoir to the working chambers but prevents flow in the opposite direction.

The piston shaft has a bore 29 which extends partly into the piston hub and communicates with the larger bore 30 in the end of the hub, this larger bore receiving the annular bearing boss 31 extending from the housing end wall 13, the boss thus serving as a bearing support for the inner end of the piston structure.

Within the inner end of the bore 29 is secured a valve seat 32 having the valve passageway 33 therethrough which may be controlled by any desired form of valve. As shown, a simple form of needle valve 34 is provided in the bore 29 for cooperation with the seat to control the size of the passageway therethrough. The low pressure working chambers 19 and 19' are connected by ports 35 with the bore 30 at one side of the valve seat, while the high pressure working chambers 20 and 20' are connected by ports 36 with the bore 29 at the other side of the valve seat so that the hydraulic fluid displaced in the working chambers upon oscillation of the piston structure will flow through the restricted valve passageway to determine the shock absorbing resistance offered by the shock absorber. The valve has threaded engagement in the shaft bore so that it may be set for adjustment of the fluid flow passageway.

Describing now the lining, it comprises the portion 37 for the cylinder wall 10, and portion 38 for the wall 11, the portions 39 and 40 for the corresponding side walls of the abutments 16 and 16', the portions 41 for the ends of the abutments, the portion 42 for the bearing flange 21, and the portions 43 for the openings 26 in the wall 11, the portions 43 providing the flow passageways 45 and the valve chambers 44 for the ball valves 28 which control the replenishing flow.

The lining is of suitable material, for example, of thermo-plastic material such as Bakelite or of die casting material such as zinc, bronze or other metallic substance. The lining material is preferably molded into place by using the housing structure as a matrix and inserting a suitable core or die member therein, the lining material in powdered, liquid, or plastic form being then forced under heat and pressure into the mold thus formed for intimate engagement with the walls to be lined so as to become practically an integral part thereof. When the core is then withdrawn, the lining will afford smooth and accurate bearings for the piston hub, vanes and shaft, and will provide the ports and valve chambers for the replenishing fluid flow from the reservoir. Costly machining is thus eliminated.

The lining will have its outer edge in alignment with the shoulder 15 so that when the wall 13 is applied it will have a close fit against said edge but the all metal annular seat 15 against which the end wall 13 finally comes to rest will prevent any undue pressure against the lining and the piston hub and vanes will have adequate working clearance for proper operation. Sealing material such as litharge and glycerine may be applied to the threading of the wall 13 to seal the threaded joint against leakage of fluid from the working chambers.

During functioning of the shock absorber, the fluid pressure outwardly against the piston structure is rather severe and therefore, in order to prevent wearing away of the portion 38 of the lining by the outer end of the piston hub and vanes, a thin plate 46 of hardened steel is interposed. This plate has the central opening 47 for receiving the piston shaft and at its opposite sides has the slots 48 shaped to receive the lining which surrounds the abutments 16 and 16', the plate being thus held against rotational displacement. The plate extends across the inner ends of the flow passageways 45 through the lining portions 43 and the plate has passageways 49 therethrough in register with the passageways and portions 50 of the plate are extended across the passageways to retain the check valve balls 28 in their valve chambers. After the lining has been formed in the housing body, the bearing plate 46 may be readily slipped into place before the piston structure is installed.

The only machining required on the shock absorber housing body is the threading 14, and the finishing of the outer ends of the abutments 16 and 16' and the face of the shoulder 15 for accurate seating of the end wall 13. During such finishing of the abutments, small shallow grooves 51 are cut in the outer end of the upper abutment 16 for communicating with a passageway 52 through the abutment leading to the top of the reservoir space 25. The edges of the portions 39 and 40 of the lining around the abutment 16 are also provided with grooves 53 forming a continuation of the grooves 51 so that the upper working chambers 19' and 20' will be in communication through these restricted grooves with the passageway 52 leading to the reservoir in order that any air or gas collecting at the top of the working chambers may find its way to the reservoir space.

A packing gland 54 is shown provided around the piston shaft in which packing material 55 is intimately held by a plate 56 surrounding the shaft and urged against the packing by a spring 57.

We have shown a practical and efficient embodiment of the features of our invention but we do not desire to be limited to the exact construction and arrangement shown and described as changes and modifications may be made without departing from the scope of the invention.

We claim as follows:

1. A hydraulic shock absorber comprising a housing body in the form of an integral structure comprising a cylindrical wall and an outer end wall having a bearing opening, a detachable inner end wall, said walls defining a cylinder space, abutments extending radially into said cylinder space from said cylindrical wall on diametrically opposite sides thereof, a piston structure comprising a cylindrical head with vanes thereon located in said cylinder space and a shaft extending through said bearing opening, and a cup-shaped liner structure of bearing material engaging with its cylindrical wall in said housing cylindrical wall and with its bottom against said outer end wall, said cylindrical wall and bottom wall of said liner structure at diametrically opposite points thereof being offset inwardly to receive said abutments and to provide lining for the sides and ends of said abutments.

2. A rotary hydraulic shock absorber comprising a housing defining a cylinder space and having one end wall provided with a bearing opening and the other end wall detachable, a hydraulic fluid abutment extending radially into said cylinder space, a piston hub within said cylinder space having a vane extending therefrom and a shaft extending through said end wall opening, and a continuous liner structure shaped to form a lining for the cylinder wall, the sides and inner end of said abutment, the inner side of said bearing wall and said bearing opening to provide bearing surfaces for said piston hub and vane and said shaft.

3. A rotary hydraulic shock absorber comprising a housing having an annular wall and end walls defining a cylinder space, one of said end walls having a bearing opening therethrough, a vaned piston within said cylinder space having a shaft journaled in said bearing opening, means providing a hydraulic fluid reservoir adjacent said bearing end wall, a flow passageway through said bearing wall between said reservoir and cylinder space, a liner of bearing material for the inner side of said bearing end wall, said liner having a projection forming a lining for said passageway and providing a port for flow of fluid from the reservoir to the cylinder space, and a check valve in said port for which said passageway lining forms a seat.

4. In a hydraulic shock absorber of the rotary type comprising a housing body having an annular wall and an end wall integral therewith, radial abutments on said annular wall, said end wall having a bearing opening, and a lining of bearing material molded in said housing body to receive and form a lining for said abutments, to form a lining for the inner side of said end wall, and to form a lining for said bearing opening.

5. A rotary hydraulic shock absorber comprising a housing having an annular wall and end walls defining a cylinder space, one of said end walls having a bearing opening therethrough, a vaned piston within said cylinder space having a shaft extending through said bearing opening, means providing a hydraulic fluid reservoir adjacent said bearing end wall, flow passageways through said bearing wall between said reservoir and cylinder space, a liner of bearing material for the inner side of said bearing end wall, said liner having a projection therefrom into said bearing opening to form a bearing for the shaft, said liner having other projections for lining said passageways and providing ports for flow of fluid from the reservoir to the cylinder space, and check valves in said ports for which said passageway linings form seats.

6. A rotary hydraulic shock absorber comprising a housing having an annular wall and end walls defining a cylinder space, one of said end walls having a bearing opening therethrough, a vaned piston within said cylinder space having a shaft extending through said bearing opening, and a liner of bearing material for the inner side of said bearing end wall and projecting through said bearing opening to form a bearing bushing for said shaft.

7. A hydraulic shock absorber comprising a housing body in the form of an integral structure comprising a cylindrical wall and an outer end wall having a bearing opening, upper and lower abutments extending radially into said cylinder space from said cylindrical wall, a detachable inner end wall having threaded engagement with the cylindrical wall for engagement against the inner ends of said abutments, a vaned piston structure operable in the cylindrical space defined by said cylindrical and end walls and having a shaft extending through said bearing opening, means providing a hydraulic fluid reservoir adjacent said outer end wall and replenishing passageways through said outer end wall between said reservoir and said cylinder space, a shallow venting channel extending transversely across the inner end of said upper abutment, said detachable inner end wall forming an outer closure for said venting channel, and a passageway through said upper abutment for connecting said venting channel with said reservoir.

RALPH F. PEO.
GERVASE M. MAGRUM.